FRACTIONAL FREQUENCY DIVIDER

Filed Sept. 10, 1946 3 Sheets-Sheet 1

INVENTOR
Arthur E. Canfora
BY H. S. Grover
ATTORNEY

INVENTOR
Arthur E. Canfora
BY
H. S. Grover
ATTORNEY

Oct. 23, 1951 A. E. CANFORA 2,572,698

FRACTIONAL FREQUENCY DIVIDER

Filed Sept. 10, 1946 3 Sheets-Sheet 3

INVENTOR
Arthur E. Canfora
BY
H. S. Grover
ATTORNEY

Patented Oct. 23, 1951 2,572,698

UNITED STATES PATENT OFFICE 2,572,698

FRACTIONAL FREQUENCY DIVIDER

Arthur E. Canfora, Brooklyn, N. Y., assignor to Radio Corporation of America, a corporation of Delaware Application September 10, 1946, Serial No. 696,013

13 Claims. (Cl. 250—36)

Figure 1:
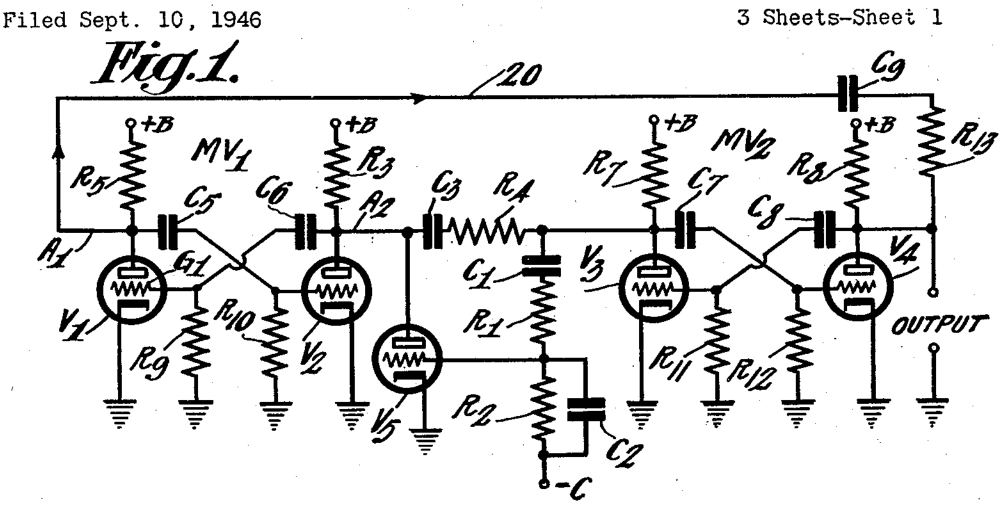

The present invention relates to improvements in fractional frequency divider circuits, and has for its primary object to enable frequency division by fractions in a single multivibrator stage.

So far as I am aware, there is, at present, no known method, other than the present invention, of dividing a frequency by a number involving a fraction in a single multivibrator stage. The conventional procedure in known methods in order to obtain a fraction of a frequency, is to take that harmonic of the frequency to be divided so that when the divisor is multiplied by the order of this harmonic, it becomes a whole number. For example, if it is desired to divide 400 c. p. s. (cycles per second) by 1.5, the second harmonic of 400 c. p. s. (800 c. p. s.) is obtained by some known means, such as a frequency multiplier, and this new frequency is divided by $1.5\times2=3$, a whole number. Mathematically, in this example, it will be seen that both the numerator and the denominator are multiplied by 2 so that the final frequency is unaltered, the relation being $$\frac{400\times2}{1.5\times2}=266.67 \text{ c. p. s.}$$

In this known method, it will be noted that a frequency multiplier circuit is required to obtain 800 c. p. s. from 400 c. p. s. Any method of frequency multiplication usually develops a sine wave output and this sine wave must be squared up for pulsing prior to division by the multivibrator. Putting it in other words, if a sine wave is employed as the source of waves whose frequency is to be divided, this sine wave must be passed through some limiter or other means to obtain a rectangular or square wave output prior to the application of this square wave output to the multivibrator which accomplishes the division process. In order to achieve these results, in accordance with conventional circuits, there are required extra electron discharge devices and various component parts.

In accordance with the present invention, fractional divisions, say 1.5, as in the example given above, is achieved directly and simply with less parts than in known types of circuits. Specifically, the only extra parts needed for the practice of this invention are two condensers, two resistors and an electron discharge device such as a triode tube. If it is assumed that the source of 400 c. p. s. frequency to be divided, is from a multivibrator which produces a rectangular wave output, then in accordance with the present invention, the 400 c. p. s. from the multivibrator source is divided by 1.5 directly and in a single multivibrator stage which is coupled to the output of the source. The extra vacuum tube is used to feedback an amplified pulse from the single multivibrator stage which does the dividing by 1.5, to the source (in the case assumed, to the preceding multivibrator) in order to reset or rephase the source after each cycle of operation of the single multivibrator stage. It should be clearly understood that the divisor 1.5 is merely given by way of example only, since other fractional divisors may also be utilized in the practice of the invention.

A more detailed description of the invention follows in conjunction with a drawing, wherein;

Fig. 1 illustrates one embodiment of a fractional frequency divider of the invention.

Figure 3:
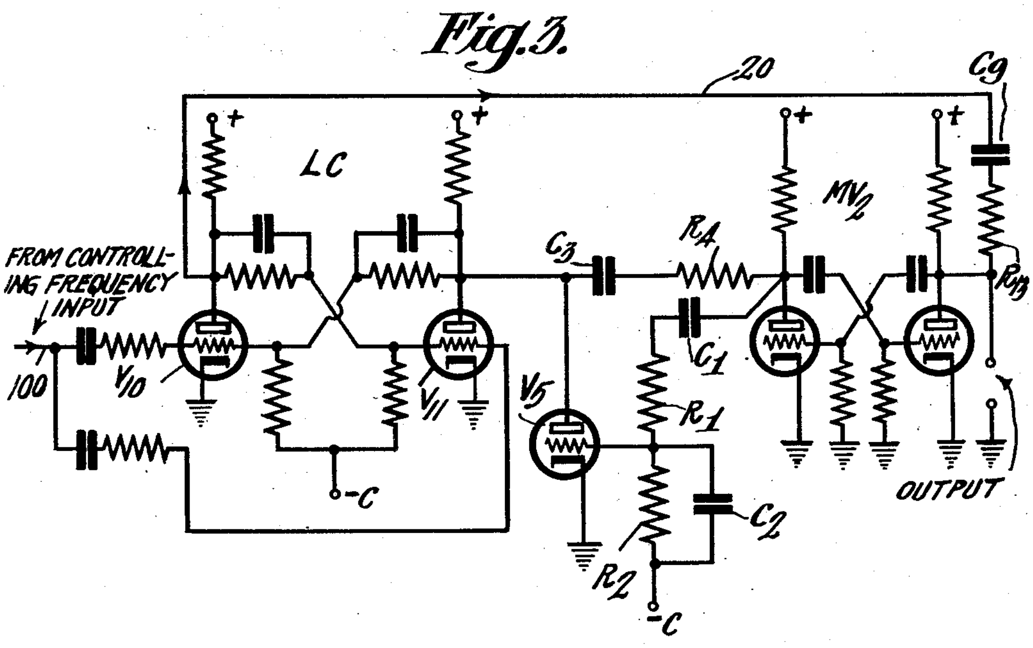
Figure 2A:
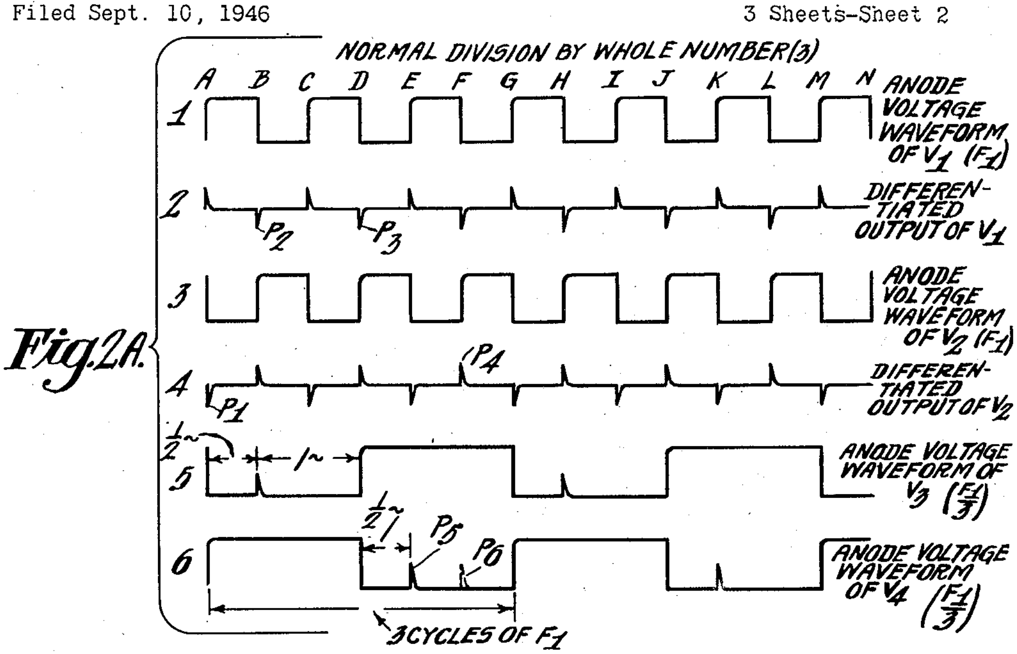
Figure 2B:
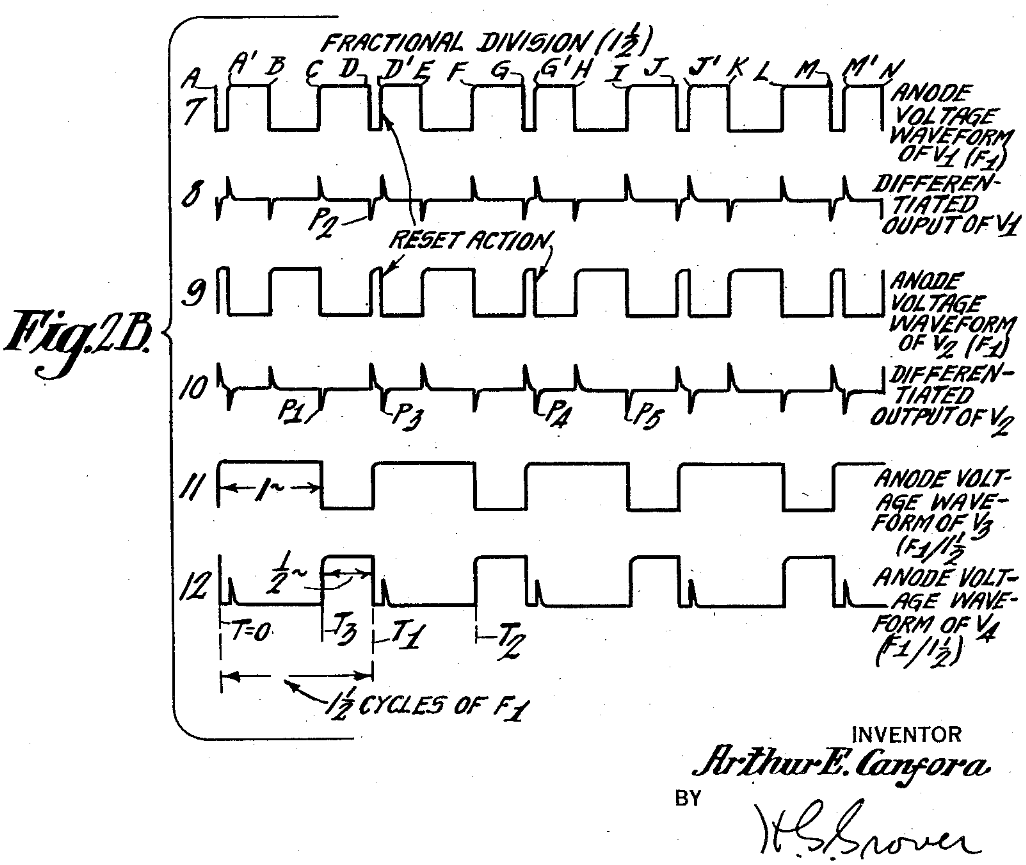
Figures 4, 5:
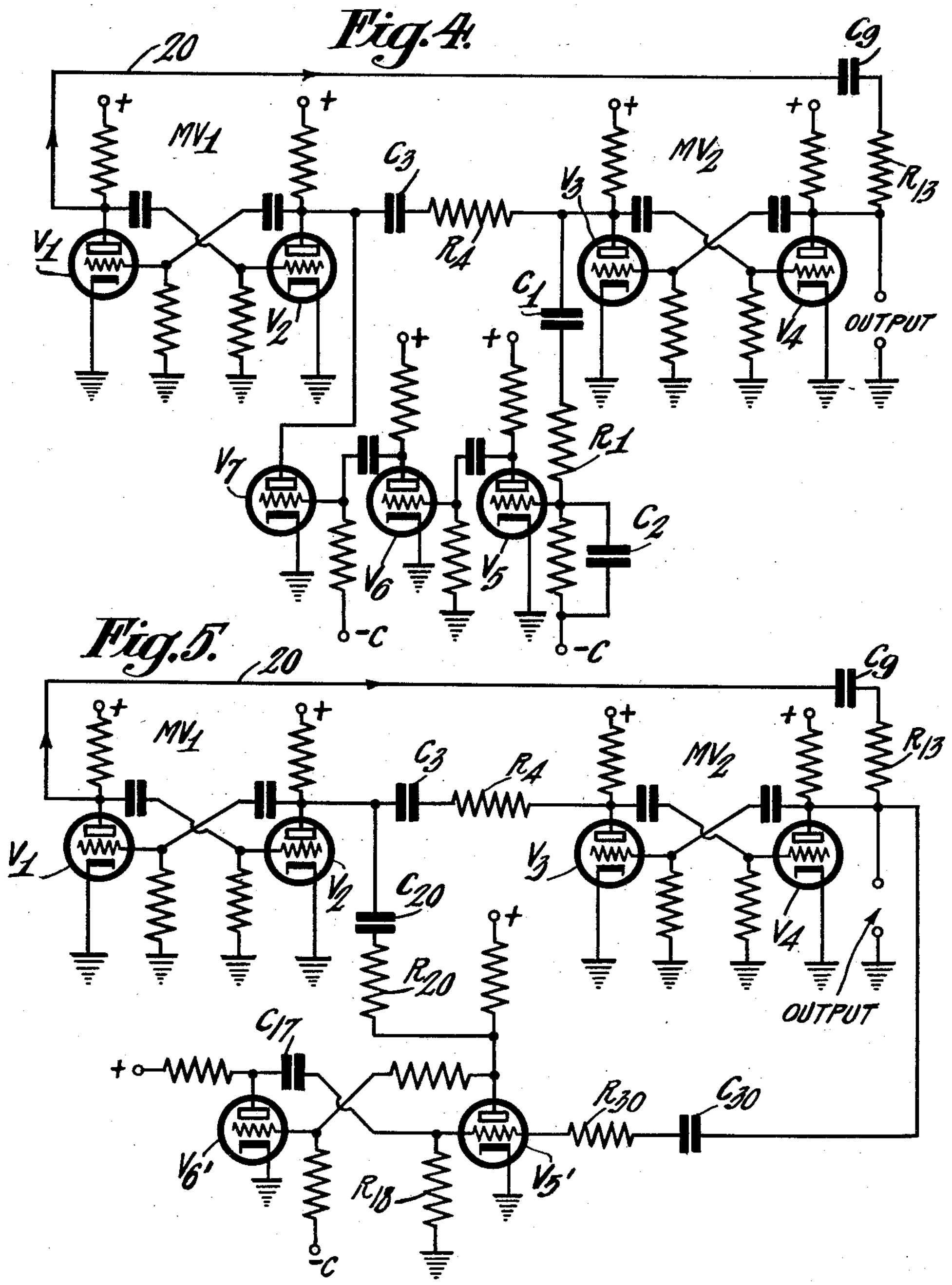

Fig. 2*a* graphically illustrates voltage wave forms which appear at different points in the circuit of Fig. 1, when used conventionally to obtain frequency division by a whole number, for example, 3, and disregarding the adjustments and essential components illustrated in Fig. 1 which constitute the gist of the present invention and which distinguish the system of Fig. 1 from a conventional circuit, and Fig. 2*b* graphically illustrates voltage wave forms occurring at different points of the system of Fig. 1 when adjusted to obtain fractional division by 1½ in accordance with the present invention, and including in the system of Fig. 1, the resetting or rephasing circuit which forms an essential part of the present invention; and Figs. 3, 4 and 5 illustrate different modifications of the system of Fig. 1. Throughout the figures of the drawing, the same parts are represented by the same reference characters.

In order to understand more fully the present invention, an exposition will now be given of the system of obtaining frequency division by a whole number, for example, 3, in conventional manner with particular reference to the graphical representation of Fig. 2*a*. In this discussion of conventional practice, no consideration will be given to the essential feature of the present invention comprising the resetting or rephasing circuit C1, R1, C2, R2 and vacuum tube V5.

Referring to Fig. 1 for the purpose of this exposition, there is shown a pair of multivibrators MV1 and MV2 comprising respectively, vacuum tubes V1, V2 and V3, V4. The vacuum tubes of each multivibrator have their grids and anodes connected regeneratively and both multivibrators have natural periods of operation. If desired, multivibrator MV1 may be controlled by an external synchronizing source although this is not shown since it is not essential for the purpose of this exposition. Multivibrator MV2 is controlled from the two outputs of MV1. The natural period of multivibrator MV2 is longer than the period of output from multivibrator MV1. This is determined in the design of the apparatus for the purpose to be accomplished, and the natural periods of the multivibrators are related to the period of the controlled pulses. Both multivibrators provide approximately rectangular wave outputs.

The anode A1 of tube V1 of multivibrator MV1 is connected to the grid of tube V2 through a condenser C5. The anode A2 of vacuum tube V2 is connected to the grid of tube V1 through condenser C6. Resistors R9 and R10 are grid return resistors and these resistors together with condensers C5 and C6 determine the free period of the multivibrator MV1. Anode potential is supplied to the tubes V1 and V2 through individual resistors R5 and R3 respectively. Such a multivibrator is well known in the art and no claim is made to the multivibrator per se.

Multivibrator MV2 is somewhat similar in construction to the multivibrator MV1 but has a different natural period of operation. The grid return resistors for vacuum tubes V3 and V4 are labeled R11 and R12, respectively. The anode resistors for these two tubes are labeled R7 and R8 respectively. The anode of tube V3 is connected to the grid of tube V4 through condenser C7. The anode of V4 is connected to the grid V3 through a condenser C8.

The anode A1 of vacuum tube V1 of multivibrator MV1 is connected via lead 20 and differentiator circuit C9, R13 to the anode of tube V4 of multivibrator MV2. The anode A2 of tube V2 of multivibrator MV1 is connected via differentiator circuit°C3, R4 to the anode of tube V3 of multivibrator MV2.

The rectangular wave outputs of tubes V1 and V2 of multivibrator MV1 taken from the anodes A1 and A2, respectively, are shown in lines 1 and 3 of Fig. 2*a*. It is assumed that the multivibrator MV1 develops rectangular wave output of 50% mark and 50% space for each cycle of frequency F1 which is the frequency of the multivibrator MV1. The output of tube V1, line 1 of Fig. 2*a*, is differentiated in circuit C9, R13 to provide sharp peaked input pulses indicated in line 2 of Fig. 2*a*, and these sharp peaked impulses are applied to the anode of tube V4 of the multivibrator MV2. The rectangular wave output from the anode of tube V2 is differentiated in circuit C3, R4 resulting in sharp peaked impulses shown in line 4 of Fig. 2*a* and which are applied to the anode of tube V3 of multivibrator MV2. The multivibrator MV2 divides the pulses of frequency F1 supplied thereto by the multivibrator MV1 by 1.5 in both sections V3 and V4 for a total division of frequency F1 by 3.

The negative peaked impulses of line 4, Fig. 2*a*, derived from differentiating the square output wave from the anode A2 of tube V2 will synchronize tube V3 of MV2 while the sharp negative impulses derived from differentiating the square output wave of anode A1 of tube V1 (line 2, Fig. 2*a*) will synchronize tube V4 of multivibrator MV2. The positive peaked impulses of lines 2 and 4 of Fig. 2*a*, resulting from the differentiation of the square waves produced by MV1 are not utilized.

The graphical representation of lines 5 and 6 of Fig. 2*a* represent respectively the anode voltage wave forms of tubes V3 and V4 of multivibrator MV2.

Starting from time A, it will be observed from an inspection of the curves of Fig. 2*a* that tube V3 has been made conducting by the negative input pulse P1 of line 4. When tube V3 conducts, there is a voltage drop on its anode for the duration during which this tube conducts. The conduction of tube V3 is accompanied by a cessation of current through tube V4, and vice versa.

After 1.5 cycles of frequency F1 in this state wherein tube V3 is conducting and tube V4 nonconducting, tube V4 must be made conducting by a negative impuse from tube V1. The wave form, line 2, Fig. 2*a*, shows a sharp negative impulse P2 occurring at time B which is ½ cycle beyond time A. Since division by 1.5 is desired, the pulse amplitude of impulse P2 is so chosen that when it is inverted and amplified by tube V3, which is now conducting (note line 5, Fig. 2*a*), this impulse P2 of line 2 will not reach the cut-off value of tube V4. The negative impulse P3 of line 2, Fig. 2*a*, however, occurring at time D, which is 1.5 cycles, beyond time A, is allowed to exceed the cut-off value of tube V4 causing it to conduct as a result of which tube V3 is turned off. Stated in other words, when the negative peak impulse P1 of line 4, Fig. 2*a* is applied to the multivibrator MV2, this last multivibrator will be in the condition where tube V3 is non-conductive and tube V4 conductive. The negative impulse P1 of line 4 will pass through condenser C7 of MV2 and turns tube V4 off and hence, turns on tube V3. It can thus be said that the negative impulse from line 4 synchronizes tube V3 because it turns this tube on. All of the differentiated pulses in lines 2 and 4 have the same amplitude. When tube V4 is first made non-conductive, and tube V3 conductive by virtue of the sharp negative impulse P1 of line 4, the bias on tube V4 is driven considerably below cut-off by virtue of the voltage drop on resistor R7 which places a negative charge on condenser C7. This negative charge on C7 gradually dissipates through resistor R12 and allows the bias on tube V4 to rise slowly until the cut-off value is reached. During this rise, the negative impulse P2 at time B from line 2, Fig. 2*a*, is applied to the multivibrator MV2, but this negative impulse is not sufficient when inverted by tube V3 to cause the tube V4 to conduct at this particular time B. When, however, the negative impulse P3 of line 2, Fig. 2*a* is applied to multivibrator MV2, the negative charge on C7 has had an opportunity to dissipate to a large extent and the rising bias voltage curve has almost reached the cut-off value of V4 at time D. The sharp impulse P3, line 2, when inverted by V3 is positive and drives the bias voltage of tube V4 above cut-off, thus allowing tube V4 to conduct at this time D and cause tube V3 to cease conducting. The same process is repeated for the other tube of MV2.

It is important to bear in mind the fact that after each transition of tubes V3 and V4 at times A, D, G, J and M, the first sharp negative impulse from the anodes of the tubes V1 and V2 of the multivibrator MV1 at the multivibrator MV2 occurs after ½ cycle of F1, and at intervals of one cycle thereafter from the same anode so that each section of multivibrator MV2 must include the fraction ½ which together totals 1, a whole number. The tubes V3 and V4 of the multivibrator MV2 thus each divide the frequency applied to this multivibrator as a whole by 1.5, thus giving total division of 3, as will be noted from an inspection of lines 5 and 6 of Fig. 2a. If the square wave output from multivibrator MV1 were 66⅔% mark and 33⅓% space, i. e., a two-to-one wave-shape, the division achieved by multivibrator MV2 would still be a whole number since one section of MV2 would have to include the fraction ⅓ cycle of F1 and the other section of MV2 would have to include the fraction ⅔ cycle of F1 which together total 1. The foregoing discussion proves the impossibility of dividing by a fraction in the usual or conventional usage of multivibrator circuits.

The foregoing description has been given to explain the principles of operation of the conventional multivibrators used as frequency dividers. The following is given in explanation of the principles underlining the present invention.

Since each of the two sections of the multivibrator MV2 contribute fractions of cycles of wave form F1 (line 1) in making up one complete cycle of multivibrator MV2, the said fractions adding to a total of 1, it will be evident that by eliminating a fraction of one section of multivibrator MV2, say the fraction contributed by tube V3, this section V3 will only contribute whole cycles of F1 while tube V4 will contribute the fraction. When adding the contribution of both sections of multivibrator MV2 to obtain the divisor of multivibrator MV2, a whole number plus a fraction will be the result. It should be understood that tube V4 need not contribute only a fraction of F1 but also any whole number of cycles of F1 plus the fraction.

Referring again to the curves of Fig. 2a, the wave form of tube V4 (line 6) shows that the first potentially effective synchronizing pulse P5 from V2 arrives after the first ½ cycle of F1 which occurs after the transition time D. In the light of what has been said above, pulse P5 must occur ½ cycle beyond this point in time as shown by the dotted pulse at time F in order to eliminate division by a fraction in one section only. Reference to the source of pulses which synchronize tube V3 (source is tube V2) shows that no negative pulse at time F, line 4, is available from this source to coincide with the dotted pulse P6. If the phase of tubes V1 and V2 were reversed prior to this time, then the positive pulse P4 of line 2 at time F would be inverted and would coincide with the dotted pulse P6 in line 6 and this condition for division by a whole number in this section would be fulfilled.

The function of tube V5 and circuit elements C1, C2, R1 and R2 is to reset or rephase tubes V1 and V2 after each cycle of multivibrator MV2 so that the condition called for above is satisfied. Each of these cycles of multivibrator MV2 will now include a half cycle of F1. If a repetition of events is to occur after every cycle of multivibrator MV2 due to a series of events in multivibrator MV1, the multivibrator MV1 must repeat its series of events by starting from the same condition each time, that is, if tube V1 is conducting at the start of the first cycle of MV2, then it must be so for the start of every cycle of MV2 in order to achieve the results of the invention. However, since a cycle of multivibrator MV2 contains a half cycle of F1, then MV1 will not normally start its series of events in the same condition it would for the preceding cycle but will be 180° out of phase. The use of vacuum tube 5 and circuit elements C1, C2, R1 and R2 in accordance with the present invention, makes it possible for multivibrator MV1 to start each cycle of multivibrator MV2 in the same condition each time by forcing a 180° phase shift.

The manner in which the resetting or rephasing of tubes V1 and V2, or the forced 180° phase shift is achieved, is as follows: At the completion of each cycle of MV2, the positive transition from MV2 which might be on the anode of tube V3 at time D when tube V3 becomes non-conductive, is differentiated by C1, R1 and R2 and applied to the grid of tube V5. Tube V5 is normally non-conducting and requires a pulse of positive polarity on its grid to cause it to conduct. The positive pulse applied to the grid of tube V5, by tube V3 when it becomes non-conductive, is amplified and inverted by tube V5 and appears on the anode A2 of tube V2 as a large negative pulse. This negative pulse will be applied to the grid of tube V1 through condenser C6 and will cause tube V1 to cease conducting which, in turn, makes tube V2 conduct. Multivibrator MV1 has now been reset to start its series of events from a definite phase condition for each cycle of multivibrator MV2. In summation, the cessation of current flow in V3 of multivibrator MV2 causes a cessation of current flow in tube V1 of multivibrator MV1.

The anode of tube V2 is chosen for injection of the negative pulse from tube V5 because tube V1 is conducting prior to the reset action and must be made non-conductive.

In order to assure that all actions are complete before resetting multivibrator MV1, there is provided a condenser C2 in parallel with resistor R2 so that the pulse resulting from the differentiation of the rectangular wave obtained from the anode of V3 in circuit with the elements C1, R1, R2 is slightly delayed. Referring to Fig. 2b, it will be seen that at time D′ immediately after time D, but not during the transition of MV1, the pulse from V5 will appear at the anode of tube V2 for effecting the reset action.

The curves of Fig. 2b show the wave forms occurring at various points in the circuit of Fig. 1 when designed to achieve the results of the present invention. Tube V3 divides by 1 and tube V4 divides by ½. At time A′, a reset has occurred. It is seen that with a reset, the first possible synchronizing pulse P1 (line 10) from tube V2 occurs one cycle of F1 after time A. There is no potentially effective negative pulse in line 10 occurring ½ cycle after time A. Since tube V3 is to divide by 1, the design procedure is to allow pulse P1, line 10, when amplified and inverted by tube V4, to reach the cut-off voltage on the grid of tube V3 to make it conduct. After this transition time (time C), the first potentially effective synchronizing pulse to tube V4 (Pulse P2 on line 8 from tube V1) occurs ½ cycle of F1 later (at time D). Since tube V4 is to divide by ½, the negative pulse P2 of line 8 is allowed to make the tube V4 conduct as a result of which tube V3 becomes non-conductive. At this time, the reset circuit goes into action and forces the V1 and V2 wave forms, lines 7 and 9, to conform with the picture they possessed at time A′ so that the exact cycle of events can recur because of the proper rephase of MV1. Stated otherwise, an inspection of curves 7 to 12 shows that the negative impulses of line 10 resulting from the differentiation of the output rectangular wave from tube V2 at times C, F, I and L will cause V4 to cease conducting and V3 to conduct. The negative impulses of line 8 resulting from differentiation of the output rectangular waves of tube V1 at transition times A, D, G, J and M will cause tube V3 to cease conducting and tube V4 to conduct. When tube V3 ceases conducting at times A, D, G, J and M, it applies a positive pulse to the differentiator C1, C2, R1 and R2 which, in turn, at times A', D', G', J', and M' cuts off the tube V5 and resets the multivibrator MV1 to the condition where V1 is non-conductive and V2 is conductive.

The negative impulses P3, P4, P5, etc., of line 10, formed from tube V2 due to the reset action, will appear so low on the voltage increment curve of the grid of tube V3, that by proper design of the system, it is prevented from synchronizing multivibrator MV2.

An inspection of lines 11 and 12 of Fig. 2b shows that tube V3 is non-conductive for a longer period of time than V4. This is achieved in the practice of the invention by providing a larger CR time constant for tube V3 than for tube V4, for example, by having resistor R11 (grid resistor for V3) of larger value than R12 (grid resistor for V4) or by having condenser C8 larger than the condenser C7, or by a suitable combination of values of these resistor and condenser elements. It will thus be seen that tubes V3 and V4 of the multivibrator MV2 are now unsymmetrically biased, so to state.

The rectangular wave pulses from tubes V1 and V2 of multivibrator MV1 (lines 7 and 9) have the same amplitude and also the impulses (lines 8 and 10) resulting from the differentiator of these rectangular waves have the same peak amplitudes. Differentiator circuits C9, R13 and C3, R4 have the same relative values.

The same results (lines 11 and 12) can be achieved by having the tube V3 and V4 biased identically (that is, the values of condensers C7, R12 and C8, R11 may be respectively the same), but the differentiated impulses (lines 8 and 10) may be given different magnitudes by providing different values for the two differentiator circuits C9, R13 and C3, R4.

The rectangular wave output of multivibrator MV2 has an amplitude which is considerably greater than the amplitude of the differentiated sharp impulses and hence, by the use of a suitable filter connected to the output terminals, only the larger amplitude rectangular waves can be made to produce the desired effective output which may be of sine wave form.

It has been assumed above that the multivibrator MV1 provides an output having a 50% mark and a 50% space wave shape and, therefore, the fraction ½ was fixed if multivibrator MV2 was to be used as a fractional divider. It will be understood for purposes of simplicity, the actual period of the reset action has been ignored since in most applications it will be negligible. If, however, the reset action is made sufficiently long, to be of importance, it follows that an appropriate adjustment in mark and space timing of MV1 would have to be made to maintain a given fractional division or count down. Corresponding, to a close approximation, if the wave shape of output of MV1 has a 3 to 1 ratio, that is, 66⅔% mark and a 33⅓% space, then the fraction which MV2 can divide by is either ¼ or ¾. This may be understood when it is appreciated that the sole purpose of the fractional frequency divider of the invention is to have one cycle of MV2 cover a whole number of cycles of multivibrator MV1 plus the conducting time of either tubes V1 or V2 of multivibrator MV1. This additional time depends on the wave shape of the output of multivibrator MV1. The relation of the permissible fraction of multivibrator MV2 with respect to the percentage times of conduction of the sections of multivibrator MV1 is as follows:

$$Fr.=\frac{N1}{N1+N2}$$

or $$\frac{N2}{N1+N2}$$

where

Fr. is the permissible fraction for MV2

N1 is the percentage time of conduction of one section of MV over 1 cycle of MV1

N2 is the percentage time of conduction of the other section of MV1 over 1 cycle of MV1.

Although the system of Fig. 1 has been shown as utilizing a multivibrator MV1 as the source of pulses whose frequency is to be fractionally divided, it should be understood that this multivibrator MV1 may be replaced by a locking circuit or any other device which can be reset at will. Such a system is illustrated in Fig. 3 wherein the locking circuit is designated LC and comprises two evacuated electron discharge devices whose grids and anodes are interconnected regeneratively and wherein one electron discharge device remains conductive and the other non-conductive until the states of conduction of both devices are reversed by an injection pulse of suitable polarity and magnitude. Such a locking device is described in U. S. Patent 1,844,950, granted February 16, 1932 to J. L. Finch. The locking circuit LC is synchronously controlled via lead 100 from an external source of pulses whose frequency it is desired to divide fractionally. In the operation of the locking circuit LC, a pulse of suitable polarity from the external source connected to lead 100 will cause the vacuum tubes V10 and V11 to reverse their current passing states, while a pulse from the anode of tube V5 will reset the locking circuit by restoring the tubes V10 and V11 to their original states of conduction. It should be noted in the operation of the system of Fig. 3, that if the controlling frequency is removed from lead 100, then multivibrator MV2 cannot be controlled by the locking circuit LC.

If desired, additional pulse amplifying tubes may be added to tube V5 of Fig. 1 when only the upper narrow portion of the feedback pulse is to be used at the higher frequencies, where the practical width of the pulse covers a considerable portion of the cycle. Such a system is shown in Fig. 4, in which tube V5 is biased well below cutoff so that only the very top portion of the pulse (narrow portion) will be amplified and inverted. Tubes V6 and V7 are merely amplifiers and inverters to give the proper polarity pulse at the anode of tube V2.

A further modification of the system of Fig. 1 is shown in Fig. 5, wherein tube V5 of Fig. 1 is replaced by a short pulse triggering circuit composed of vacuum tubes V5' and V6'. The active time of trigger circuit V5', V6' is determined by the time constants of condenser C17 and resistor R18. The active time is adjusted to be just short enough to allow all transitions of MV1 and MV2 to be completed before the reset occurs. The negative pulse from the anode of tube V4 or MV2 is used to activate the trigger circuit V5', V6' via a circuit including condenser C30 and resistor R30. The trigger circuit is merely an alternative method of delaying the reset of multivibrator MV1. It should be noted that the reset pulse for MV1 is obtained from the anode of tube V5' and passed along to MV1 via the series circuit of resistor R20 and condenser C20.

What I claim is:

1. A first rectangular wave generating circuit provided with a push-pull output and having two degrees of electrical stability, a second rectangular wave generating circuit provided with push-pull input and output terminals and also having two degrees of electrical stability, means for deriving an output from one end of said second circuit push-pull output, separate respective connections from the push-pull output of said first circuit to the push-pull input of said second circuit for controlling said second circuit, and means responsive to the waveform at only one end of said second circuit push-pull output for periodically resetting said first circuit to a particular degree of stability.

2. A frequency divider circuit comprising first and second multivibrators producing waves of different frequencies, said second multivibrator having a lower frequency of operation than said first multivibrator, said multivibrators each comprising a pair of push-pull controllable discharge paths which are regeneratively interconnected, individual and respective connections from the outputs of each of the controllable discharge paths of said first multivibrator to said second multivibrator discharge paths for controlling said second multivibrator, means connected with said second multivibrator and responsive to the transition of only one path of said second multivibrator from the current passing to the non-current passing condition for generating a reset signal, and means for applying said reset signal to said first multivibrator and resetting said first multivibrator to a particular degree of stability.

3. A frequency divider in accordance with claim 2, characterized in this, that the two electrode sections of said second multivibrator are unsymmetrically biased.

4. A frequency divider in accordance with claim 2, including a differentiator circuit in each of said individual connections, and wherein the two discharge paths of said second multivibrator are associated with different operating time constants.

5. A frequency divider in accordance with claim 2, including a differentiator circuit in each of said individual connections, said differentiator circuits having different circuit constants.

6. In combination, a first push-pull rectangular wave generator having two degrees of electrical stability, a multivibrator having push-pull control input terminals and output terminals also having two degrees of stability, means for causing said generator to produce waves of a frequency which is higher than the frequency of operation of said multivibrator, respective connections from the push-pull output of said generator to the push-pull control input of said multivibrator for controlling the operation of said multivibrator, and means coupled between one end of the push-pull output of said multivibrator and said generator said means being responsive to the transition of said multivibrator from one degree of stability to the other for restoring the generator to a predetermined condition of stability.

7. In combination, a first rectangular wave source having push-pull signal output terminals with means for reversing the signal phase of said terminals, a multivibrator having two degrees of at least partial stability and available connections adapted to receive push-pull control signals, means for causing said wave source to produce waves of a frequency which is higher than the frequency of operation for which said multivibrator is adapted, connections from the push-pull output terminals of said wave source to said push-pull connections of said multivibrator for controlling the operation of said multivibrator, differentiator circuits in said connections, and means coupled between said multivibrator and the wave source phase reversing means and responsive to the transition of said multivibrator from one degree of stability to the other for establishing a predetermined output terminal phase for said wave source.

8. A combination as defined in claim 6 characterized in this, that said rectangular wave source is a multivibrator, and said connections include differentiator circuits.

9. In combination, a first rectangular wave source having push-pull signal output terminals with means for reversing the phase of said terminals, a multivibrator having two degrees of at least partial stability and available connections adapted to receive push-pull control signals, means for causing said wave source to produce waves of a frequency which is higher than the frequency of operation for which said multivibrator is adapted, connections from the push-pull output terminals of said wave source to said push-pull connections of said multivibrator for controlling the operation of said multivibrator, differentiator circuits in said connections, phase control means coupled between said multivibrator and the wave source phase reversing means and responsive to the transition of said multivibrator from one degree of stability to the other for establishing a predetermined output terminal phase for said wave source, and means including said phase control means for producing a delay in the establishment of said given predetermined output terminal phase of said wave source as the result of a given transition of said multivibrator from one degree of stability to the other.

10. A system in accordance with claim 9, characterized in this, that said last means includes the series circuit of a first tube biased well below cut-off, and a pair of amplifier and inverter tubes.

11. An electrical count-down system comprising in combination: a source of primary electrical signal of substantially rectangular waveform defining alternate mark and space timing intervals, a first and second output connection to said primary signal source such as to extract therefrom a push-pull signal referenced to a given voltage datum, a control connection to said primary signal source for reversing the phase of the push-pull signals applied to said first and second output terminals in accordance with a phase reversing signal, a multivibrator type circuit having two degrees of at least partial stability with a time constant circuit controlling the duration of at least one of said degrees of stability, said multivibrator having push-pull input control terminals and output terminals for sampling single-ended output voltage variations, control connections from said primary signal source first and second output connections to said multivibrator push-pull input control terminals; and means connected with said multivibrator for developing a phase reversing signal in accordance with a transition of said multivibrator from one degree of at least partial stability to another degree of at least partial stability, said phase reversing signal being applied to said primary signal source control connection whereby the signal appearing at the single-ended output of said multivibrator describes a frequency which is fractionally related to the signal frequency of said primary signal source.

12. Apparatus according to claim 11 wherein a delay network is interposed between said multivibrator and said phase reversal signal generating means such that the push-pull output signal of said primary signal source is delayed by a predetermined time interval in its controlled reversal in accordance with a multivibrator transition.

13. Apparatus according to claim 12 wherein the time constant of said multivibrator defining the time interval of one degree of stability is rendered a predetermined function of the ratio of mark to space timing intervals of said primary signal source.

ARTHUR E. CANFORA.

REFERENCES CITED

The following references are of record in the file of this patent:

UNITED STATES PATENTS

| Number | Name | Date |
|---|---|---|
| 2,304,813 | Gibbs | Dec. 15, 1942 |
| 2,306,386 | Hollywood | Dec. 29, 1942 |
| 2,402,916 | Schroeder | June 25, 1946 |
| 2,402,917 | Miller | June 25, 1946 |
| 2,410,156 | Flory | Oct. 29, 1946 |

OTHER REFERENCES

Grossdoff "Electronic Counters" RCA Review—September 1946, vol. VII—No. 13, pp. 438–447.